United States Patent [19]
Turnbull et al.

[11] Patent Number: 5,599,041
[45] Date of Patent: Feb. 4, 1997

[54] INFLATABLE VEHICLE OCCUPANT RESTRAINT

[75] Inventors: Roy C. Turnbull, Troy; Ali S. Emambakhsh, Rochester Hills; Kimberly A. Schwerin, Sterling Heights; Gwendolyn C. Hatten, Utica; Marie C. Kravetz, Warren, all of Mich.

[73] Assignee: TRW Vehicle Safety Systems Inc., Lyndhurst, Ohio

[21] Appl. No.: 547,608

[22] Filed: Oct. 24, 1995

[51] Int. Cl.$^6$ ................................................. B60R 21/24
[52] U.S. Cl. ........................ 280/724; 280/738; 280/743.1
[58] Field of Search ................................. 280/724, 738, 280/743.1

[56] References Cited

U.S. PATENT DOCUMENTS

| | | | |
|---|---|---|---|
| 3,733,091 | 5/1973 | Fleck et al. | 280/729 |
| 3,784,225 | 1/1974 | Fleck et al. | 280/729 |
| 3,788,663 | 1/1974 | Weman | 280/729 |
| 3,843,150 | 10/1974 | Harada et al. | 280/729 |
| 3,887,213 | 6/1975 | Goetz | 280/738 |
| 3,888,505 | 6/1975 | Shibamoto | 280/738 |
| 3,907,327 | 9/1975 | Pech | 280/729 |
| 3,929,350 | 12/1975 | Pech | 280/729 |
| 4,076,277 | 2/1978 | Kuwakado et al. | 280/738 |
| 5,249,824 | 10/1993 | Swann et al. | 280/729 |
| 5,282,646 | 2/1994 | Melvin et al. | 280/729 |
| 5,338,061 | 8/1994 | Nelson et al. | 280/729 |
| 5,358,273 | 10/1994 | Onishi et al. | 280/743.1 |
| 5,372,381 | 12/1994 | Herridge | 280/743.1 |
| 5,427,410 | 6/1995 | Shiota et al. | 280/743.1 |

*Primary Examiner*—Kenneth R. Rice
*Attorney, Agent, or Firm*—Tarolli, Sundheim, Covell, Tummino & Szabo

[57] ABSTRACT

An inflatable air bag (10) includes axially spaced inboard and outboard side sections (200, 202) and an intermediate section (204) extending between the side sections. The air bag has a primary chamber (160) which has a generally U-shaped configuration when inflated. A base portion (162) of the primary chamber (160) extends between the inboard and outboard side sections (200, 202) of the air bag (10) and receives inflation fluid from an inflator (186). Axially spaced first and second inflatable side portions (164,166) of the primary chamber (160) are in fluid communication with the base portion (162) of the primary chamber at opposite axial sides of the base portion. The air bag also (10) includes a secondary chamber (170). At least one secondary panel (20) of the air bag (10) has at least one ambient air aspiration opening (40) for aspirating ambient air into the secondary chamber (170). The secondary chamber (170) is located between the first and second inflatable side portions (164, 166) of the primary chamber (160). The inboard side section (200) of the air bag (10) consists of the first side portion (164) of the primary chamber (160). The outboard side section (202) of the air bag (10) consists of the second side portion (166) of the primary chamber (160). The secondary panel (20) is movable, upon inflation of the primary chamber (160), to draw ambient air through the aspiration opening (40) into the secondary chamber (170) to inflate the secondary chamber upon inflation of the primary chamber.

14 Claims, 7 Drawing Sheets

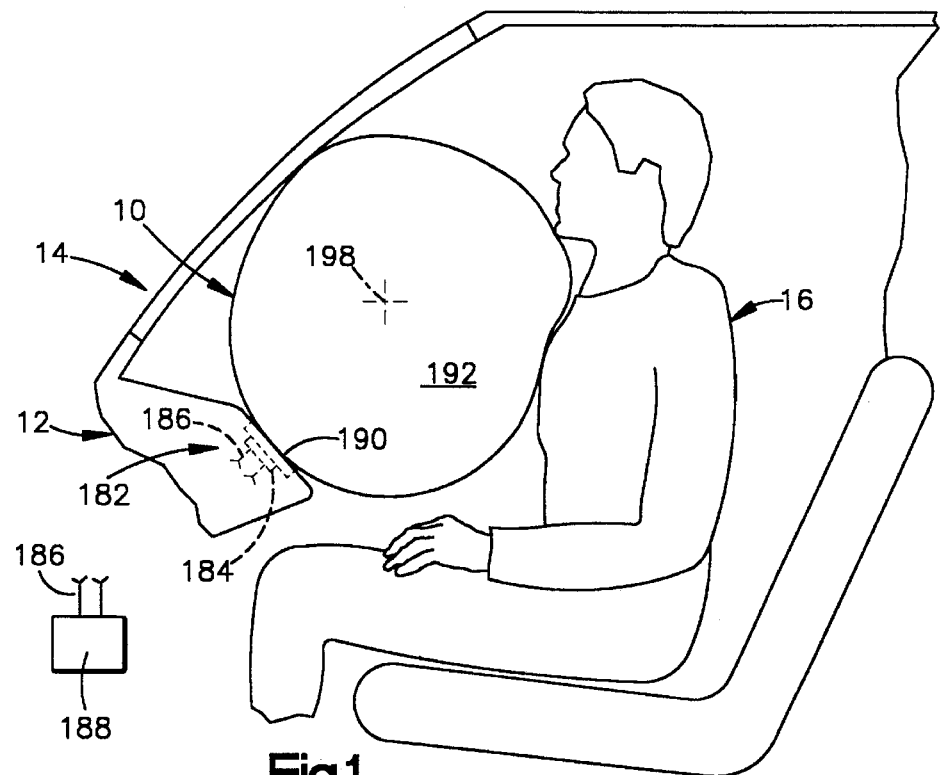
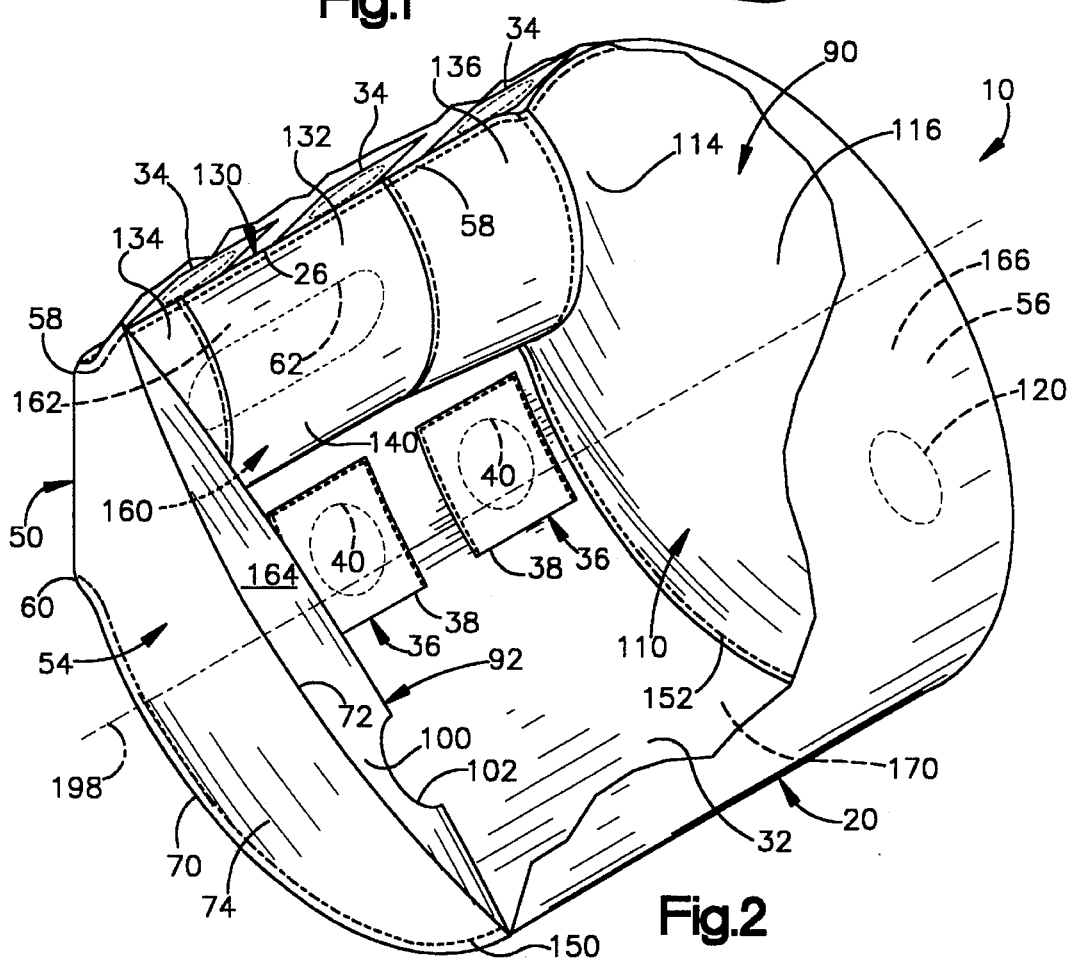

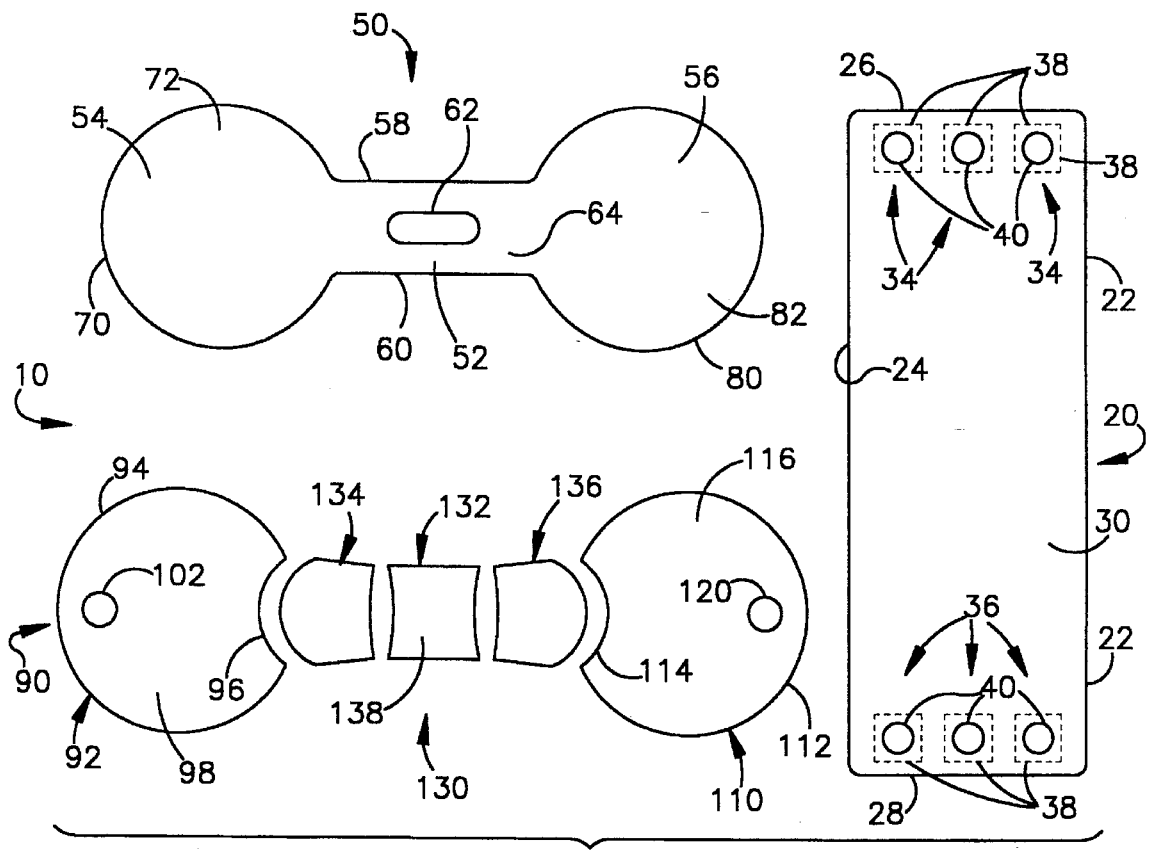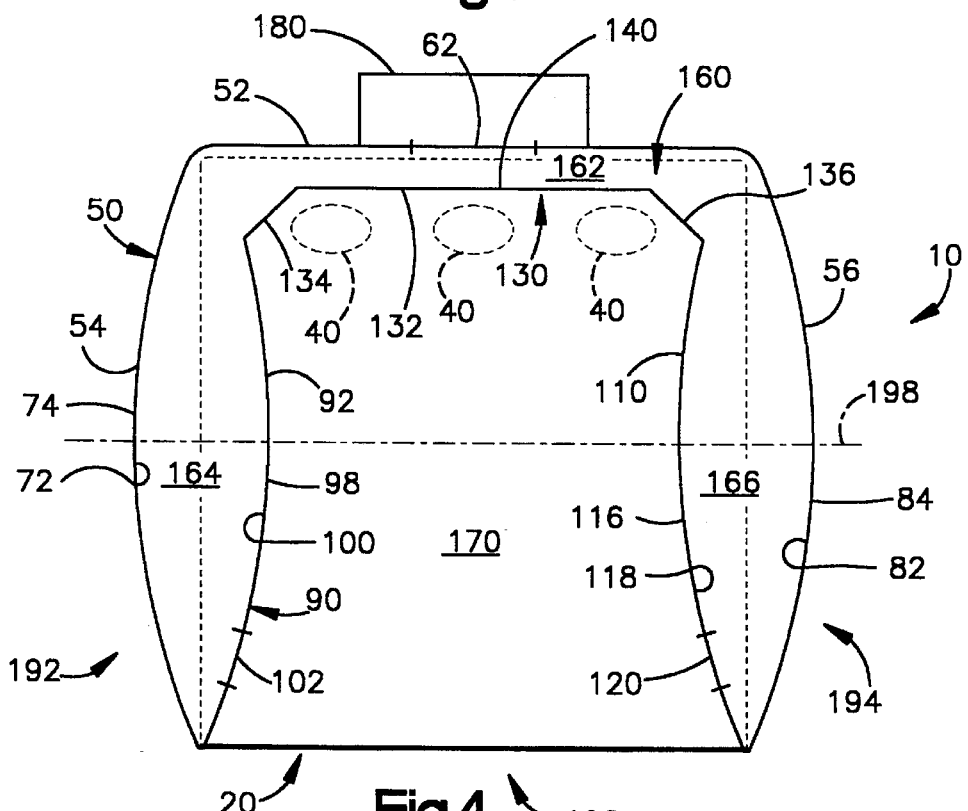

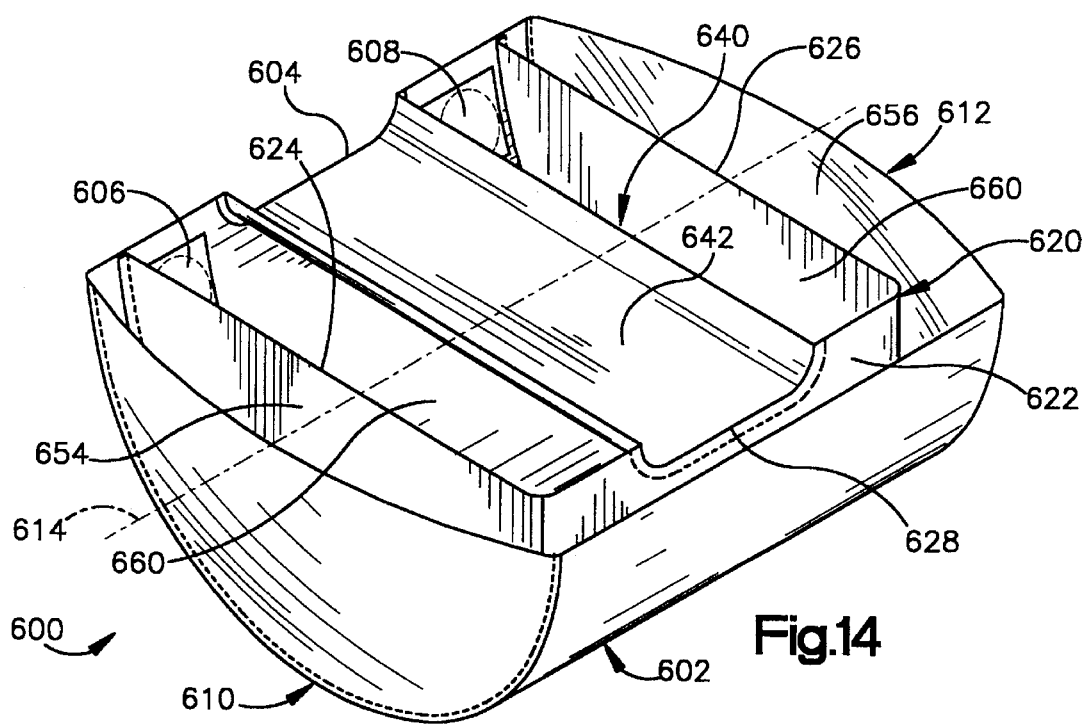
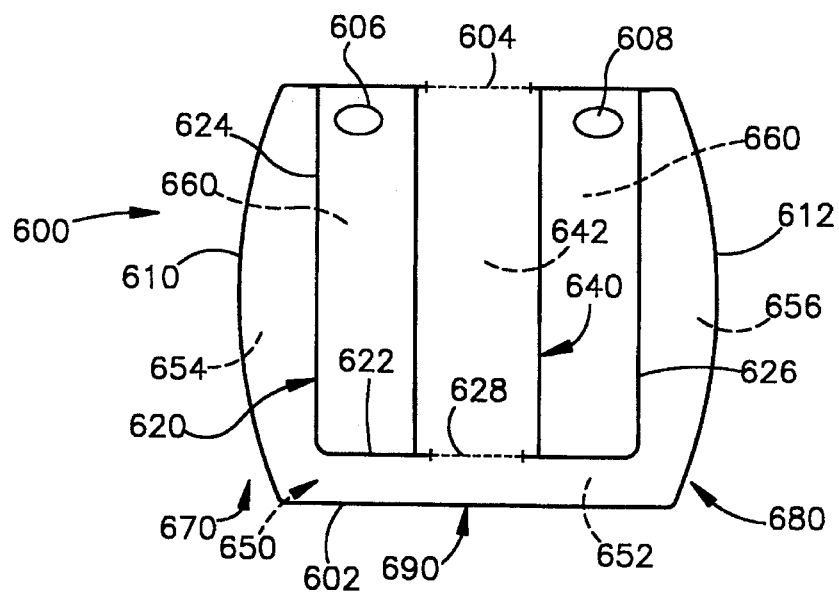
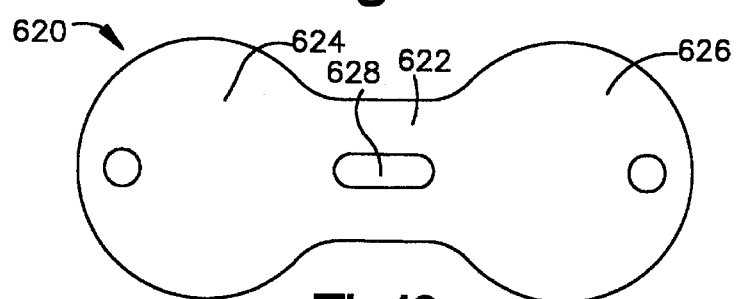

5,599,041

INFLATABLE VEHICLE OCCUPANT RESTRAINT

BACKGROUND OF THE INVENTION

1. Technical Field

The present invention relates to an inflatable vehicle occupant restraint, and is particularly directed to an air bag for protecting an occupant of a vehicle in the event of a vehicle collision.

2. Description of the Prior Art

A particular type of inflatable vehicle occupant restraint, typically referred to as an "air bag", is commonly used to protect a vehicle occupant in the event of sudden vehicle deceleration such as occurs in a vehicle collision. The air bag is inflated with inflation fluid into a position adjacent to the vehicle occupant to protect the vehicle occupant from forcefully striking parts of the vehicle. The inflation fluid is provided by an air bag inflator.

It is desirable to minimize the amount of inflation fluid which is required to inflate an air bag. If less inflation fluid is required, an inflator can be used which is lighter and which takes up less space in the vehicle. It is also desirable to minimize the weight and dimensions of an inflator.

SUMMARY OF THE INVENTION

The present invention is an inflatable vehicle occupant restraint for protecting an occupant of a vehicle. The inflatable restraint has a deflated condition and an inflated, occupant protecting condition. The inflatable restraint when in the inflated condition includes inboard and outboard side sections and an intermediate section extending between the side sections. The inflatable restraint has an axis which extends along the length of the inflatable restraint between the inboard and outboard side sections.

The inflatable restraint includes primary panel means for defining a primary chamber. The primary chamber has a generally U-shaped configuration when inflated. The primary panel means includes base panel means for defining a base portion of the primary chamber which extends between the inboard and outboard side sections of the inflatable restraint and which receives inflation fluid from an inflator. The primary panel means also includes first and second side panel means for defining axially spaced first and second inflatable side portions of the primary chamber which are in fluid communication with the base portion of the primary chamber at opposite axial ends of the base portion.

The inflatable restraint also includes secondary panel means for defining a secondary chamber. The secondary panel means includes at least one secondary panel having at least one ambient air aspiration opening for aspirating ambient air into the secondary chamber. The secondary chamber is located between the first and second inflatable side portions of the primary chamber.

The inboard side section of the inflatable restraint consists of the first side panel means for defining the first side portion of the primary chamber. The outboard side section of the inflatable restraint consists of the second side panel means for defining the second side portion of the primary chamber. The secondary panel is movable by the first and second side panel means, upon inflation of the primary chamber, to draw ambient air through the aspiration opening into the secondary chamber to inflate the secondary chamber upon inflation of the primary chamber.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic side view of an air bag constructed in accordance with the present invention shown in an inflated, occupant protecting condition;

FIG. 2 is a schematic perspective view, partially cut away, of the air bag of FIG. 1 in an inflated condition;

FIG. 3 is a plan view of panels of fabric material in a condition prior to being sewn to make the air bag of FIG. 1;

FIG. 4 is a schematic view showing the two-chambered construction of the air bag of FIG. 1 when in the inflated condition;

FIG. 14 is a schematic cutaway view similar to FIG. 2 of an air bag which is constructed in accordance with a sixth embodiment of the present invention;

FIG. 15 is a schematic view showing the two-chambered construction of the air bag of FIG. 14 when in an inflated condition; and FIG. 16 is a plan view of a panel of fabric material which forms a part of the air bag of FIG. 14.

DESCRIPTION OF PREFERRED EMBODIMENTS

Figure 5:
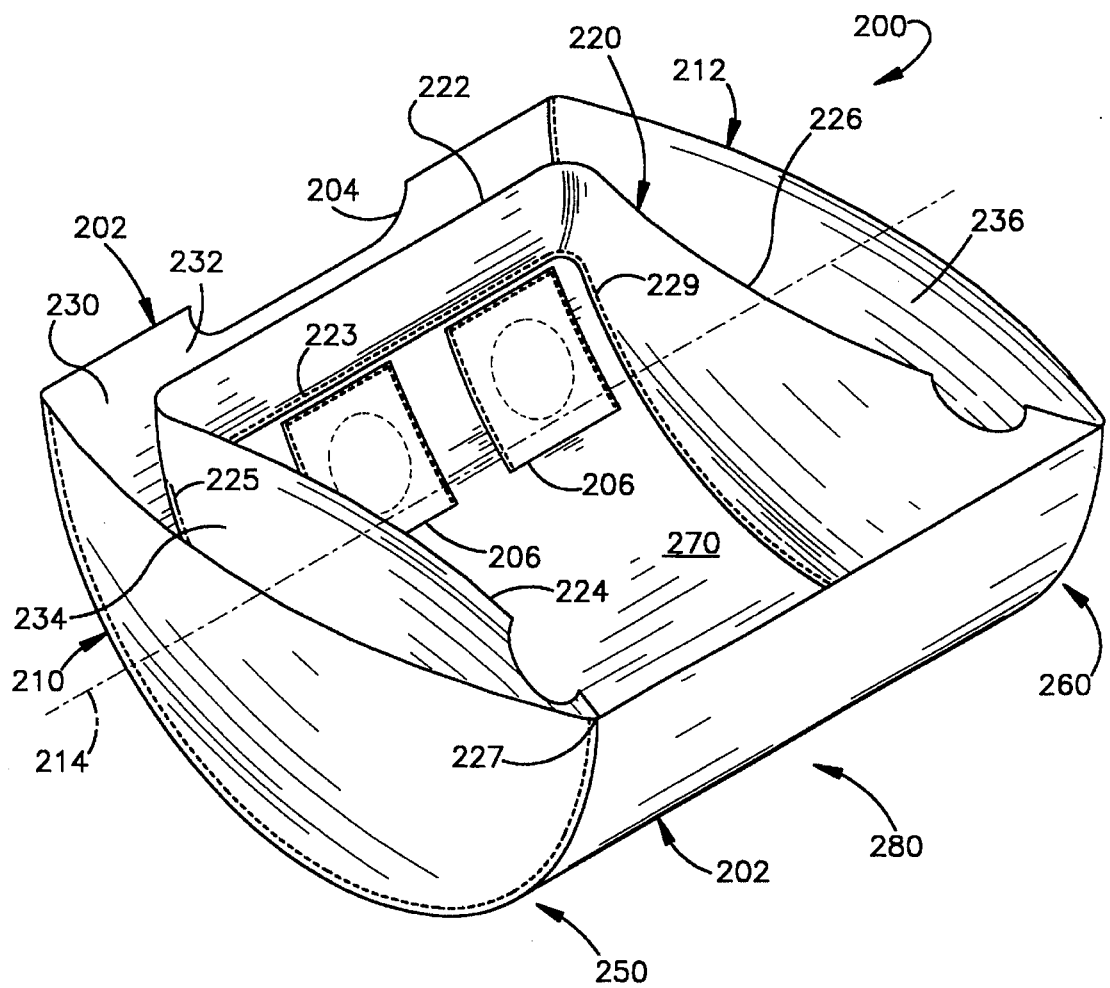
FIG. 5 is a schematic cutaway view similar to FIG. 2 of an air bag which is constructed in accordance with a second embodiment of the present invention.

The present invention relates to a vehicle occupant restraint which is inflatable to help protect an occupant of a vehicle. The present invention is applicable to various inflatable restraint constructions. As representative of the present invention, FIG. 1 illustrates a specific inflatable vehicle occupant restraint 10, commonly known as an "air bag". The air bag 10 is illustrated as being inflatable from an instrument panel 12 of a vehicle 14 to help protect an occupant 16 of the vehicle from contact with parts of the vehicle. The air bag 10 could be inflatable from any desired part of the vehicle.

The air bag 10 (FIG. 2) is made from a plurality of panels of fabric material, preferably woven nylon, which are sewn together to form the air bag. One of the panels of the air bag 10 is a center panel 20 having a generally rectangular configuration as defined by parallel first and second side edges 22 and 24 and parallel first and second end edges 26 and 28. The center panel 20, as illustrated, is a single piece of fabric material having an outer side surface 30 and an inner side surface 32 (FIG. 2).

The air bag 10 includes a plurality of identical ambient air aspiration vents 34 and 36 on the center panel 20. In the air bag 10 illustrated in FIGS. 1–4, three aspiration vents 34 are disposed adjacent the first end edge 26 of the center panel 20. Three aspiration vents 36 are disposed adjacent the second end edge 28 of the center panel 20. Each one of the aspiration vents 34 and 36 is of a known construction including a patch 38 of fabric material sewn, on three sides, to the inner side surface 32 of the center panel 20, to overlie an opening 40 in the material of the center panel. When the air bag 10 is in the assembled condition illustrated in FIG. 2, the patches 38 are on the interior of the air bag and are disposed inside the openings 40 in the center panel. The aspiration vents 34 and 36 act as one-way valves, to allow the flow of ambient air into the air bag 10 through the openings 40 while generally restricting fluid flow out of the air bag through the openings 40.

In addition to the center panel 20, the air bag 10 includes an outer panel 50. The outer panel 50 is a single fabric material panel having a generally rectangular back portion 52 interconnecting first and second generally circular side portions 54 and 56. The back portion 52 of the outer panel 50 is defined by parallel side edges 58 and 60 between which is located an inflation fluid opening 62. The inflation fluid opening 62 extends between an inner side surface 64 and an opposite outer side surface (not shown) of the back portion 52 of the outer panel 50.

The first side portion 54 of the outer panel 50 has a circular outer periphery 70 which merges into the side edges 58 and 60 of the back portion 52 of the outer panel. The first side portion 54 of the outer panel 50 has an outer side surface 72 and an opposite inner side surface 74. The second side portion 56 of the outer panel 50 is a mirror image of the first side portion 54. A circular outer periphery 80 of the second side portion 56 of the outer panel 50 merges into the side edges 58 and 60 of the back portion 52 of the outer panel. The second side portion 56 has an outer side surface 82 and an opposite inner side surface 84.

The air bag 10 also includes an inner panel 90 which is generally similar in overall configuration to the outer panel 50. The inner panel 90 is, however, made from five separate fabric material panels rather than one single fabric material panel. It should be understood that the center panel 20 and the outer panel 50 could, like the inner panel 90, be made from multiple separate fabric material panels. Also, materials other than fabric or woven nylon could be used to make the panels of the air bag 10, such as plastic film.

The inner panel 90 (FIG. 3) includes a first inner side panel 92 which has a generally circular configuration including a circular outer periphery 94 interrupted by an arcuate connector portion 96. The first inner side panel 92 has a first surface 98 and an opposite second side surface 100. A circular vent opening 102 extends between the surfaces 98 and 100 at a location adjacent to the outer periphery 94 and spaced apart diametrically from the connector portion 96.

A second inner side panel 110 of the inner panel 90 is a mirror image of the first inner side panel 92. The second inner side panel 110 has a circular outer periphery 112 interrupted by an arcuate connector portion 114, and opposite first and second side surfaces 116 and 118. A circular vent opening 120 extends between the surfaces 116 and 118 at a location adjacent to the outer periphery 112 and spaced apart diametrically from the connector portion 114.

The inner panel 90 also includes a back portion 130 which is made up of an inner back panel 132 and first and second corner panels 134 and 136. The inner back panel 132 is generally rectangular in configuration and has a first side surface 138 and an opposite second side surface 140. The first corner panel 134 is disposed between and interconnects the inner back panel 132 and the first inner side panel 92. The second corner panel 136 is a mirror image of the first corner panel 134 and is disposed between the inner back panel 132 and the second inner side panel 110 of the inner panel 90.

In manufacture of the air bag 10, the five separate panels 92, 110, 132, 134, and 136 are sewn together to form the inner panel 90. The inner panel 90, the outer panel 50 and the center panel 20 are then sewn together to form the air bag 10.

Specifically, the circular outer periphery 94 of the first inner side panel 92 of the inner panel 90, the circular outer periphery 70 of the first side portion 54 of the outer panel 50, and the first side edge 24 of the center panel 20 are sewn together with one or more stitching lines indicated schematically at 150. The second side surface 100 of the first inner side panel 92 of the inner panel 90 is presented toward the inner side surface 72 of the first side portion 54 of the outer panel 50.

The outer periphery 112 of the second inner side panel 110 of the inner panel 90, the outer periphery 80 of the second side portion 56 of the outer panel 50, and the second side edge 22 of the center panel 20 are sewn together with one or more stitching lines indicated schematically at 152. The second side surface 118 of the second inner side panel 110 of the inner panel 90 is presented toward the inner side surface 82 of the second side portion 56 of the outer panel 50.

The first corner panel 134 is sewn to the connector portion 96 of the first inner side panel 92 of the inner panel 90. The second corner panel 136 is sewn to the connector portion 114 of the second inner side panel 110 of the inner panel 90. The back portion 130 of the inner panel 90, that is, the assembly of the first and second corner panels 134 and 136 and the inner back panel 132, is sewn to the side edges 58 and 60 of the back portion 52 of the outer panel 50.

The first end edge 26 of the center panel 20 is sewn to the first side edge 58 of the back portion 52 of the outer panel 50, and also to the back portion 130 of the inner panel 90. The second end edge 28 of the center panel 20 is sewn to the second side edge 60 of the back portion 52 of the outer panel 50, and also to the back portion 130 of the inner panel 90.

The air bag 10 as thus formed from the panels 20, 50 and 90 includes a primary chamber 160 and a secondary chamber 170. The air bag 10 may be considered as including primary panels for defining the primary chamber 160. The primary panels include the center panel 20, the outer panel 50, and the inner panel 90. The air bag 10 may also be considered as including secondary panels for defining the secondary chamber 170. The secondary panels include the center panel 20 and the inner panel 90.

The primary chamber 160 has a generally U-shaped configuration when in the inflated condition shown in FIGS. 2 and 4. The U-shaped configuration of the primary chamber includes a base portion 162 and first and second inflatable side portions 164 and 166. The base portion 162 of the primary chamber 160 has a generally tubular configuration defined by the back portion 52 of the outer panel 50 and the back portion 130 of the inner panel 90. The inflation fluid opening 62 in the back portion 52 of the outer panel 50 opens into the base portion 162 of the primary chamber 160.

The inflatable side portions 164 and 166 of the primary chamber 160 are spaced apart axially along a longitudinal central axis 198 of the air bag 10. The first inflatable side portion 164 of the primary chamber 160 has a generally disk-shaped configuration extending radially outward from the axis 198. The first inflatable side portion 162 is defined by the first side portion 54 of the outer panel 50 and the first inner side panel 90 of the inner panel 90. The first inflatable side portion 164 of the primary chamber 160 is in fluid communication with the base portion 162 of the primary chamber at one end (to the left as viewed in FIGS. 2 and 3) of the base portion.

The second inflatable side portion 166 of the primary chamber 160 has a generally disk-shaped configuration extending radially outward from the axis 198. The second inflatable side portion 166 is defined by the second side portion 56 of the outer panel 50 and the second inner side panel 110 of the inner panel 90. The second inflatable side portion 166 of the primary chamber 160 is in fluid communication with the base portion 162 of the primary chamber at the end of the base portion opposite from the first inflatable side portion 164 of the primary chamber.

The secondary chamber 170 of the air bag 10 is disposed generally between the first and second inflatable side portions 164 and 166 of the primary chamber 160 of the air bag. The secondary chamber 170 of the air bag 10 is defined generally by the center panel 20 and the inner panel 90 of the air bag. The inner panel 90 acts as a barrier or partition between the secondary chamber 170 of the air bag 10 and the primary chamber 160.

A tubular retainer panel or attachment panel 180 (FIG. 4) is connected with the back portion 52 of the outer panel 50 in a known manner. The retainer panel 180 encircles the inflation fluid opening 62. The assembled air bag 10 is thereafter folded and mounted in the instrument panel 12 (FIG. 1) of the vehicle 16 as a portion of an air bag module indicated schematically at 182. The module 182 includes, in addition to the air bag 10, an inflator indicated schematically at 184. The inflator 184 is connected by lead wires 186 with electric circuitry of the vehicle 16, indicated schematically at 188, which includes a power source, such as the vehicle battery, and a deceleration sensor. A cover (not shown) closes an opening 190 in the instrument panel 12 through which the air bag 10 is inflatable. The cover is preferably made of a suitable plastic and may form a portion of the vehicle instrument panel 12.

In the event of a vehicle emergency situation, such as sudden vehicle deceleration, which requires inflation of the air bag 10 to help protect the vehicle occupant 16, the deceleration sensor in the vehicle electric circuitry 188 causes electric current to be supplied over the lead wires 186 to the inflator 184. The inflator 184 is actuated, in a known manner, to direct inflation fluid into the retainer panel 180 of the air bag 10. Inflation fluid under pressure from the inflator 184 flows through the inflation fluid opening 62, into the base portion 162 of the primary chamber 160 of the air bag 10, to inflate the base portion of the primary chamber. The inflation fluid flows through the base portion 162 of the primary chamber 160 into the first and second inflatable side portions 164 and 166 of the primary chamber. The inflation fluid inflates the first and second inflatable side portions 164 and 166 of the primary chamber 160 so that the primary chamber of the air bag attains the generally U-shaped configuration shown in FIGS. 2 and 4.

The air bag 10, when inflated, is disposed generally in a position in front of the vehicle occupant 16. In this condition, the air bag 10 has a generally cylindrical configuration including an inboard side section 192 and an outboard side section 194. An intermediate section 196 of the inflated air bag 10 extends between the inboard and outboard side sections 192 and 194. The longitudinal central axis 198 of the inflated air bag 10 extends along the length of the air bag between the inboard and the outboard side sections 192 and 194.

The inboard side section 192 of the air bag 10 is formed entirely from those portions of the panels 20, 50 and 90 which define the first inflatable side portion 164 of the primary chamber 160. The outboard side section 194 of the inflated air bag 10 is formed entirely from those portions of the panels 20, 50 and 90 which define the second inflatable side portion 166 of the primary chamber 160. The first and second inflatable side portions 164 and 166 of the primary chamber 160 extend transverse to the axis 198 of the air bag 10 at opposite axial ends of the cylindrical configuration of the air bag.

When the primary chamber 160 of the air bag 10 inflates, the portions of the panels 20, 50 and 90 which form the primary chamber pull, or move, the center panel 20 of the air bag from a folded and stored condition (not illustrated) to an inflated position as shown in FIGS. 2 and 4. As the center panel 20 is moved to the inflated position, the secondary chamber 170, which is defined by the center panel and the inner panel 90, rapidly enlarges in volume. The flow of inflation fluid from the primary chamber 160 into the enlarging secondary chamber 70, through the relatively small vent openings 102 and 120, is not sufficient to maintain the pressure in the secondary chamber. The pressure in the rapidly enlarging secondary chamber 170 drops to a pressure lower than the ambient pressure (around the air bag 10). Because of this differential between the pressure in the secondary chamber 170 and the ambient air pressure, ambient air is drawn into the secondary chamber through the aspiration vents 34 and 36 in the center panel 20. The flow of ambient air into the secondary chamber 170 through the aspiration vents 34 and 36 is sufficient to inflate the secondary chamber during the time period in which the primary chamber 160 is inflating. When the pressure in the secondary pressure 170 of the air bag 10 rises to a level greater than ambient air pressure, the aspiration vents 34 and 36 close.

The final pressure in the secondary chamber 170 is typically less than the pressure in the primary chamber 160. The secondary chamber 170 is located in a rearward, center portion of the air bag 10. The relatively low pressure in the secondary chamber 170 provides the air bag 10 with a softer and less rigid portion for contact by the head and upper torso of the vehicle occupant 16.

When the air bag 10 is in the inflated condition, the inner panel 90 acts as a barrier panel extending between the primary chamber 160 and the secondary chamber 170. The inner panel 90 substantially blocks the flow of inflation fluid from the primary chamber 160 into the secondary chamber 170 upon inflation of the primary chamber. The vent openings 102 and 120 in the inner panel 90 allow a small flow of inflation fluid from the primary chamber 160 into the secondary chamber 170 to help to inflate the secondary chamber upon inflation of the primary chamber. It should be understood that the vent openings 102 and 120 in the inner panel 90 are optional and may not be needed depending on the particular configuration of the air bag 10 in which they are installed. It should also be understood that more than or fewer than two vent openings between the primary and secondary chambers 160 and 170 may be provided, or vent openings of different size, shape, or placement can be provided.

FIG. 5 illustrates schematically an air bag 200 which is constructed in accordance with a second embodiment of the present invention. The air bag 200, like the air bag 10, includes a secondary chamber in the rearward, center portion of the air bag. The air bag 200 includes a center panel 202 having a generally rectangular configuration and including an inflation fluid opening 204 and a plurality of aspiration vents 206. The aspiration vents 206 have the same construction as the aspiration vents 34 and 36 (FIG. 2). Inboard and outboard side panels 210 and 212 (FIG. 5), each having a generally circular configuration centered on an axis 214, are sewn to the center panel 202. The air bag 200, and specifically the center panel 202, has a generally cylindrical configuration when inflated as shown in FIG. 5.

The air bag 200 includes a partition panel 220 which is similar in configuration to the outer panel 50 (FIG. 3) of the air bag 10. The partition panel 220 (FIG. 5) includes a generally rectangular central portion 222 which extends between first and second, or inboard and outboard, side portions 224 and 226. Each one of the side portions 224 and 226 of the partition panel 220 has a generally circular configuration centered on the axis 214.

The partition panel 220 is sewn together with the center panel 202 and the side panels 210 and 212. Specifically, the linear edges of the central portion 222 of the partition panel 220 are sewn to the center panel 202 with parallel stitching lines 223 one of which is shown schematically in FIG. 5. The stitching lines 223 are located on opposite sides of (above and below as viewed in FIG. 5) the inflation fluid opening 204 in the center panel 202.

The circular outer periphery of the inboard side portion 224 of the partition panel 220 is sewn to the center panel 202 with a circumferential stitching line indicated schematically at 225. The stitching line 225 extends axially outward and circumferentially away from the left-hand (as viewed in FIG. 5) end of the stitching line 223 to about the seam 227 between the inboard side panel 210 and the center panel 202. As a result, the section of the inboard side portion 224 of the partition panel 220 which is closest to the inflation fluid opening 204 is disposed farthest from the inboard side panel 210.

In the same manner, the circular outer periphery of the outboard side portion 226 of the partition panel 220 is sewn to the center panel 202 with a circumferential stitching line indicated schematically at 229. The stitching line 229 extends axially outward and circumferentially away from the right-hand (as viewed in FIG. 5) end of the stitching line 223 to about the seam between the outboard side panel 212 and the center panel 202. As a result, the section of the inboard side portion 226 of the partition panel 220 which is closest to the inflation fluid opening 204 is disposed farthest from the outboard side panel 212.

The air bag 200 as thus sewn includes a U-shaped primary chamber 230 and a secondary chamber 270. The air bag 200 may be considered as including primary panels for defining the primary chamber 230. The primary panels include the center panel 202, the side panels 210 and 212, and the partition panel 220. The air bag 200 may also be considered as including secondary panels for defining the secondary chamber 270. The secondary panels include the center panel 202 and the partition panel 220.

The primary chamber 230 includes a base portion 232 which extends axially between an inboard inflatable side portion 234 of the primary chamber and an outboard inflatable side portion 236 of the primary chamber. The portions of the panels 202, 210 and 220 which define the first inflatable side portion 234 of the primary chamber 230 form a first side section 250 of the air bag 200. The portions of the panels 202, 212 and 220 which define the second inflatable side portion 236 of the primary chamber 230 form a second side section 260 of the air bag 200.

When the primary chamber 230 of the air bag 200 is inflated by inflation fluid under pressure flowing through the inflation fluid opening 204, the center panel 202 is moved to an inflated position as shown in FIG. 5 so that the secondary chamber 270 rapidly enlarges. The rapid enlargement of the secondary chamber 270 causes the fluid pressure in the secondary chamber to drop to a level below ambient air pressure. Ambient air flows into the secondary chamber 270 via the aspiration vents 206 (FIG. 5) to inflate the secondary chamber.

The secondary chamber 270 is disposed in a rearward, center portion of the air bag 200. The secondary chamber 270 forms an intermediate section 280 of the air bag 200. The intermediate section 280 is disposed between the first side section 250 and the second side section 260 of the air bag 200.

Figure 6:
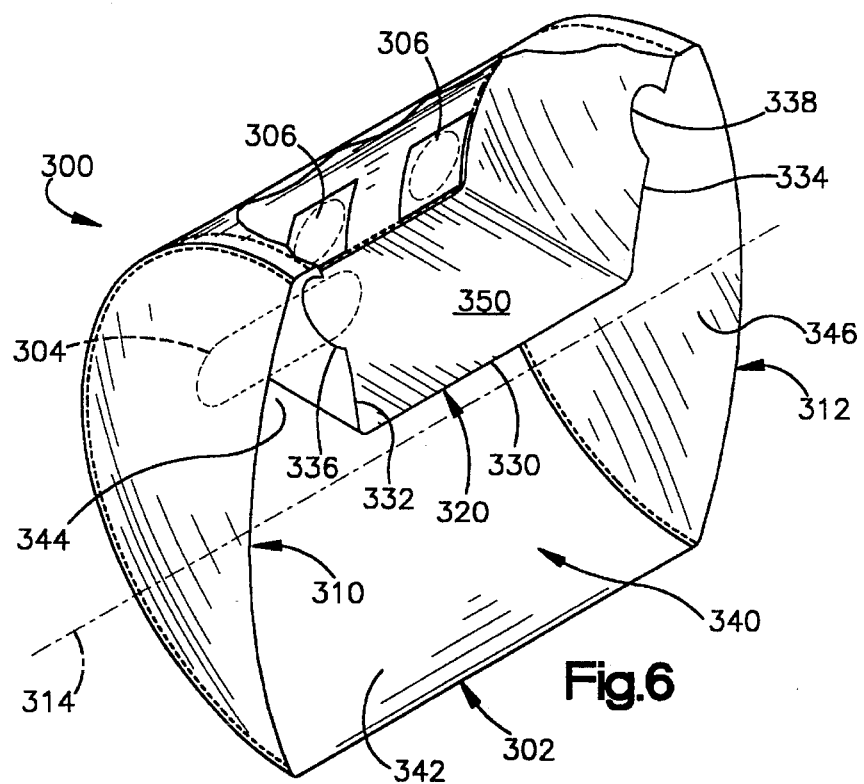
FIG. 6 is a schematic cutaway view similar to FIG. 2 of an air bag which is constructed in accordance with a third embodiment of the present invention.
Figure 7:
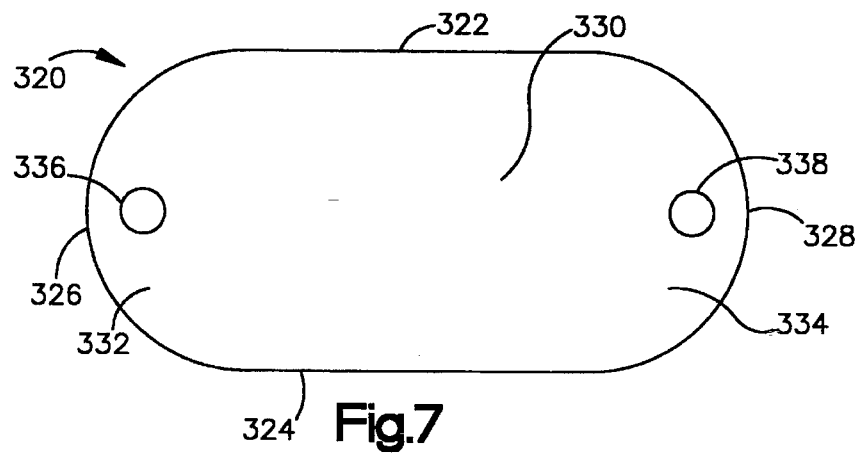
FIG. 7 is a plan view of a panel of fabric material which forms a part of the air bag of FIG. 6.
Figure 8:
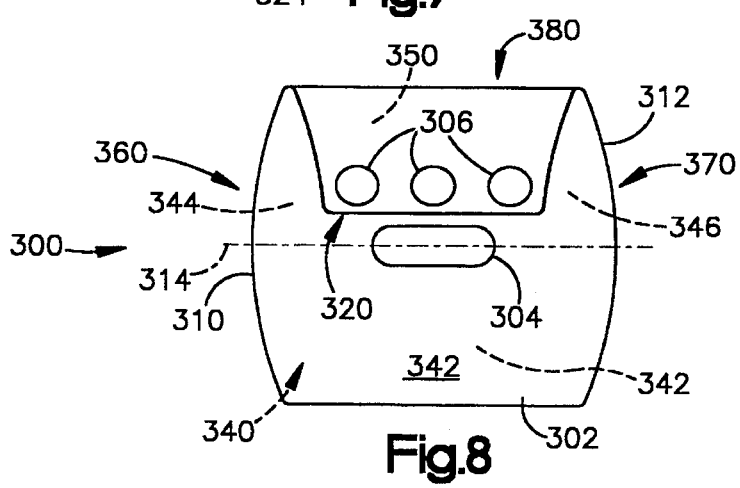
FIG. 8 is a schematic view similar to FIG. 4 showing the two-chambered construction of the air bag of FIG. 6 when in an inflated condition.

FIGS. 6–8 illustrate an air bag 300 which is constructed in accordance with a third embodiment of the present invention. The air bag 300 has a generally cylindrical configuration like that of the air bags 10 and 200. The air bag 300 includes a secondary chamber 350 formed in the upper center portion of the air bag.

The air bag 300 includes a center panel 302 having a generally rectangular configuration and including an inflation fluid opening 304 and a plurality of aspiration vents 306. A pair of circular side panels 310 and 312 are sewn to the center panel 302 to provide the air bag 300, when inflated, with a generally cylindrical configuration centered on an axis 314.

The air bag 300 also includes a partition panel 320 having a generally oval-shaped configuration as best seen in FIG. 7. The partition panel 320 has parallel side edges 322 and 324 and semicircular end edges 326 and 328. The partition panel 320 has a central portion 330 and opposite first and second end portions 332 and 334. A vent opening 336 is formed in the first end portion 332 of the partition panel 320. A vent opening 338 is formed in the second end portion 334 of the partition panel 320.

The partition panel 320 is sewn together with the center panel 302 and the side panels 310 and 312 in a manner shown in FIGS. 6 and 8. The first end portion 332 of the partition panel 320 is disposed adjacent to, but spaced apart, from the first side panel 310 of the air bag 300. The second end portion 334 of the partition panel 320 is disposed adjacent to, but spaced apart from, the second side panel 312 of the air bag 300. The central portion 330 of the partition panel 320 is disposed below (as viewed in FIGS. 6 and 8) the aspiration openings 306 in the center panel 302.

The air bag 300 as thus constructed includes a primary chamber 340 and a secondary chamber 350. The air bag 300 may be considered as including primary panels for defining the primary chamber 340. The primary panels include the center panel 302, the side panels 310 and 312, and the partition panel 320. The air bag 300 may also be considered as including secondary panels for defining the secondary chamber 350. The secondary panels include the center panel 302 and the partition panel 320.

The primary chamber 340 has a generally U-shaped configuration, including a base portion 342 and first and second inflatable side portions 344 and 346. The side portions 344 and 346 of the primary chamber 340 are spaced apart on opposite sides of the secondary chamber 350 which is formed between the center panel 302 and the partition panel 320. The primary chamber 340 of the air bag 300 is inflated by pressurized inflation fluid through the inflation fluid opening 304. The secondary chamber 350 is inflated by the flow of ambient air through the aspiration vents 306 and, to a small extent, inflation fluid through the vent openings 336 and 338.

The portions of the panels 302, 310 and 320 which define the first inflatable side portion 344 of the primary chamber 340 form a first side section 360 (FIG. 8) of the air bag 300. The portions of the panels 302, 312 and 320 which define the second inflatable side portion 346 of the primary chamber 340 form a second side section 370 of the air bag 300. The air bag 300 also has an intermediate section 380 extending between the side sections 360 and 370. The intermediate section 380 includes the secondary chamber 350 as well as the base portion 342 of the primary chamber 340.

Figures 9, 10:
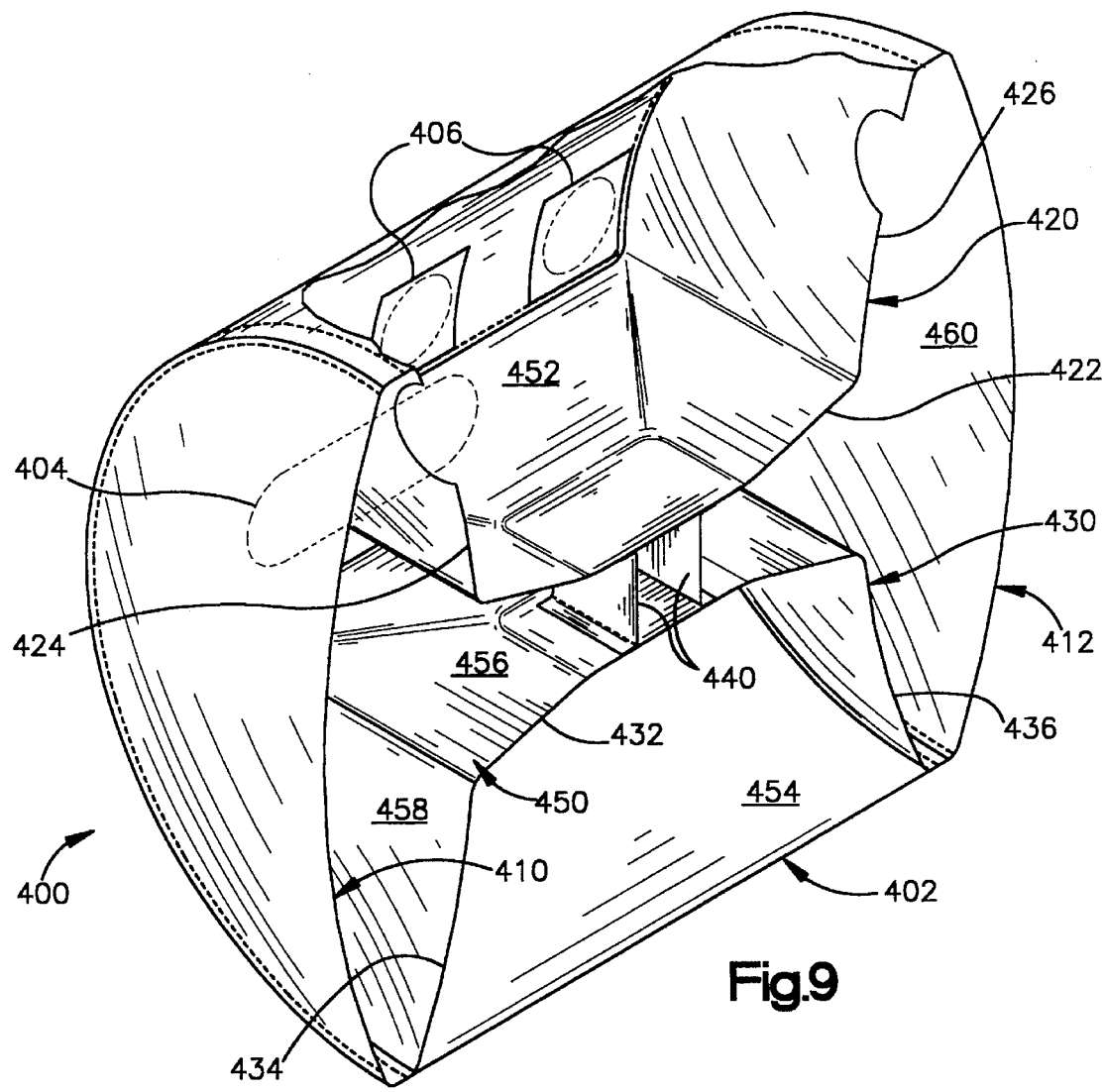
FIG. 9 is a schematic cutaway view similar to FIG. 2 of an air bag which is constructed in accordance with a fourth embodiment of the present invention.
FIG. 10 is a schematic view similar to FIG. 4 showing the three-chambered construction of the air bag of FIG. 9 when in an inflated condition.

FIGS. 9 and 10 illustrate an air bag 400 which is constructed in accordance with a fourth embodiment of the present invention. The air bag 400 includes secondary chambers which are located in upper and lower center portions of the inflated air bag.

The air bag 400 includes a center panel 402 having a generally rectangular configuration and including an inflation fluid opening 404 and a plurality of aspiration vents 406 and 408. A pair of generally circular side panels 410 and 412 are sewn to the center panel 402 to provide the air bag 400, when inflated, with a generally cylindrical configuration centered on an axis 414.

The air bag 400 includes a pair of identical upper and lower partition panels 420 and 430. The upper partition panel 420 has a generally oval-shaped configuration similar to that of the partition panel 320 (FIG. 6) of the air bag 300. The upper partition panel 420 (FIGS. 9 and 10) includes a central portion 422 and semicircular side portions 424 and 426. The lower partition panel 430 includes a central portion 432 and semicircular side portions 434 and 436.

The upper partition panel 420 is sewn to the center panel 402 so that, when the air bag 400 in inflated, the first side portion 424 of the upper partition panel is disposed adjacent to, but spaced apart from, the first side panel 410 of the air bag 400. The second side portion 426 of the partition panel 420 is disposed adjacent to, but spaced apart from, the second side panel 412 of the air bag 400. The lower partition panel 430 is sewn to the center panel 402 so that, when the air bag 400 is inflated, the first side portion 434 of the lower partition panel is disposed adjacent to, but spaced apart from, the first side panel 410 of the air bag. The second side portion 436 of the lower partition panel 430 is disposed adjacent to, but spaced apart from, the second side panel 412 of the air bag 400. A pair of tether panels 440 interconnect the center portion 422 of the upper partition panel 420 and the center portion 432 of the lower partition panel 430.

The air bag 400 includes a primary chamber 450 which is inflated by inflation fluid under pressure through the inflation fluid opening 404. The air bag 400 also includes an upper secondary chamber 452 and a lower secondary chamber 454 which are inflated by ambient air through the aspiration vents 406 and 408. The air bag 400 may be considered as including primary panels for defining the primary chamber 450. The primary panels include the center panel 402, the side panels 410 and 412, and the partition panels 420 and 430. The air bag 400 may be considered as including secondary panels for defining the secondary chambers 452 and 454. The secondary panels include the center panel 302 and the partition panels 420 and 430.

The primary chamber 450 includes a base portion 456 which extends between first and second axially spaced inflatable side portions 458 and 460. The tether panels 440 extend through the base portion 456 of the primary chamber 450. The upper secondary chamber 452 and the lower secondary chamber 454 are disposed between the first and second inflatable side portions 458 and 460.

The portions of the panels which define the first inflatable side portion 458 of the primary chamber 450 form a first side section 470 (FIG. 10) of the air bag 400. The portions of the panels which define the second inflatable side portion 460 of the primary chamber 450 form a second side section 480 of the air bag 400. The secondary chambers 452 and 454, together with the base portion 456 of the primary chamber 450, form an intermediate section 490 of the air bag 400. The intermediate section 490 of the air bag 400 is disposed between and extends between the side sections 470 and 480 of the air bag.

Figure 11:
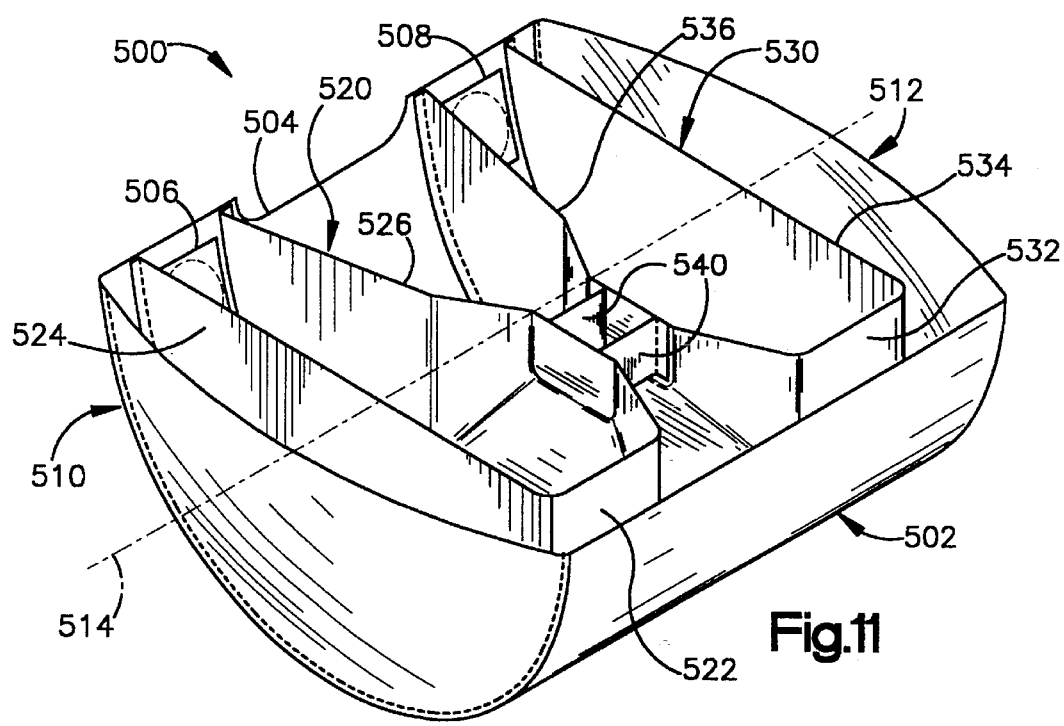
FIG. 11 is a schematic cutaway view similar to FIG. 2 of an air bag which is constructed in accordance with a fifth embodiment of the present invention.
Figure 12:
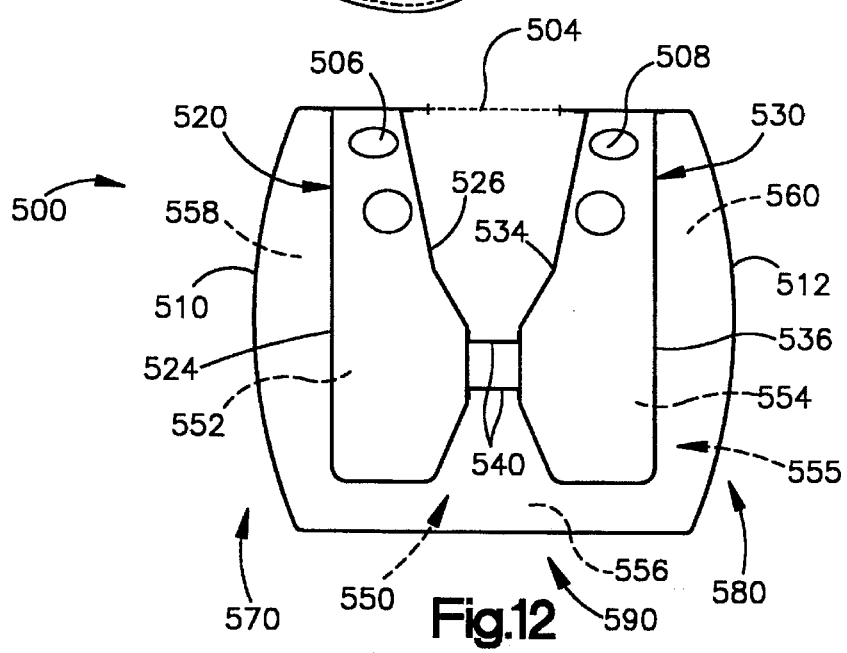
FIG. 12 is a schematic view showing the three-chambered construction of the air bag of FIG. 11 when in an inflated condition.
Figure 13:
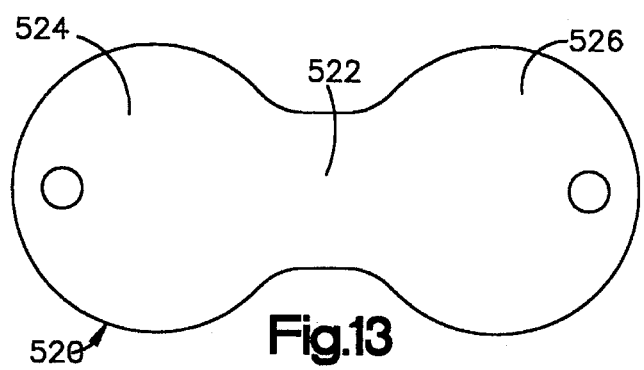
FIG. 13 is a plan view of a panel of fabric material which forms a part of the air bag of FIG. 11.

FIGS. 11–13 illustrate an air bag 500 which is constructed in accordance with a fifth embodiment of the present invention. The air bag 500 includes a pair of secondary chambers which are located in inboard and outboard center portions of the inflated air bag.

The air bag 500 includes a center panel 502 having a generally rectangular configuration and including an inflation fluid opening 504 and a plurality of aspiration vents 506 and 508. A pair of generally circular side panels 510 and 512 are sewn to the center panel 502 to provide the inflated air bag 500 with a generally cylindrical configuration extending around an axis 514.

The air bag 500 includes a pair of identical inboard and outboard partition panels 520 and 530. The inboard partition panel 520 (FIG. 13) has a configuration which is similar to that of the partition panel 50 (FIG. 3) of the air bag 10. The inboard partition panel 520 includes a central portion 522 and circular first and second side portions 524 and 526. The outboard partition panel 530 (FIGS. 11 and 12) includes a central portion 532 and circular first and second side portions 534 and 536. The air bag 500 also includes a pair of tether panels 540.

The inboard partition panel 520 is sewn to the center panel 502 so that, when the air bag 500 is inflated, the first side portion 524 of the inboard partition panel is disposed adjacent to, but spaced apart from, the first side panel 510 of the air bag. The outboard partition panel 530 is sewn to the center panel 502 so that, when the air bag 500 is inflated, the first side portion 534 of the outboard partition panel is disposed adjacent to, but spaced apart from, the second side panel 512 of the air bag. The second side portion 536 of the outboard partition panel 530 is disposed adjacent to, but spaced apart from, the second side portion 526 of the inboard partition panel 520. The tether panels 540 interconnect the second side portion 536 of the outboard partition panel 530 and the second side portion 526 of the inboard partition panel 520.

The panels of the air bag 500 define a primary chamber 550 (FIG. 12) which is inflated by inflation fluid under pressure flowing through the inflation fluid opening 504. The primary chamber 550 includes a U-shaped portion 555 which includes a base portion 556 and axially spaced, first and second inflatable side portions 558 and 560. The air bag 500 also includes an inboard secondary chamber 552 and an outboard secondary chamber 554 which are inflated by ambient air flowing through the aspiration vents 506 and 508, respectively. The inboard secondary chamber 552 and the outboard secondary chamber 554 are disposed between the first and second inflatable side portions 558 and 560.

The air bag 500 may be considered as including primary panels for defining the primary chamber 550. The primary panels include the center panel 502, the side panels 510 and 512, and the partition panels 520 and 530. The air bag 500 may be considered as including secondary panels for defining the secondary chambers 552 and 554. The secondary panels include the center panel 502 and the partition panels 520 and 530.

The portions of the panels which define the first inflatable side portion 558 of the primary chamber 550 form a first side section 570 (FIG. 9) of the air bag 500. The portions of the panels which define the second inflatable side portion 560 of the primary chamber 550 form a second side section 580 of the air bag 500. The secondary chambers 552 and 554, together with the base portion 556 of the primary chamber 550, form an intermediate section 590 of the air bag 500. The intermediate section 590 of the air bag 500 is disposed between and extends between the side sections 570 and 580 of the air bag.

FIGS. 14–16 illustrate an air bag 600 which is constructed in accordance with a sixth embodiment of the present invention. The air bag 600 includes a generally tubular secondary chamber 660 which is located in a central portion of the inflated air bag.

The air bag 600 includes a center panel 602 having a generally rectangular configuration and including an inflation fluid opening 604 and a plurality of aspiration vents 606 and 608. A pair of generally circular side panels 610 and 612 are sewn to the center panel 602 to provide the inflated air bag 600 with a generally cylindrical configuration extending around an axis 614.

The air bag 600 includes a single partition panel 620. The partition panel 620 has a configuration which is similar to that of the partition panel 50 (FIG. 3) of the air bag 10. The partition panel 620 (FIGS. 14–16) includes a central portion 622 and circular first and second side portions 624 and 626. An inflation fluid opening 628 is formed in the central portion 622 of the partition panel 620.

The partition panel 620 is sewn to the center panel 602 so that, when the air bag 600 is inflated, the first side portion 624 of the partition panel is disposed adjacent to, but spaced apart from, the first side panel 610 of the air bag. The second side portion 626 of the partition panel 620 is disposed adjacent to, but spaced apart from the second side panel 612 of the air bag 600. The inflation fluid opening 628 in the central portion 622 of the partition panel 620 is spaced apart from the inflation fluid opening 604 in the center panel 602.

The air bag 600 also includes an extended retainer panel 640. The extended retainer panel has a tubular cross-sectional configuration and extends between the portion of the center panel 602 surrounding the inflation fluid opening 604 and the central portion 622 of the partition panel 620. The extended retainer panel 640 defines an inflation fluid passage 642 extending from the inflation fluid opening 604 to the inflation fluid opening 628 in the partition panel 620.

The panels of the air bag 600 define a U-shaped primary chamber 650 which is inflatable by inflation fluid under pressure flowing through the inflation fluid opening 604. The air bag 600 may be considered as including primary panels for defining the primary chamber 650. The primary panels include the center panel 602, the side panels 610 and 612, the extended retainer panel 640, and the partition panel 620.

The inflation fluid flows from the inflation fluid opening 604 in the center panel 602 and into the extended retainer panel 640. The extended retainer panel 640, when inflated, may assume a circular cross-sectional configuration rather than the oval-shaped cross-sectional configuration illustrated in FIG. 16. The inflation fluid exits the extended retainer panel 640 through the inflation fluid opening 628 in the partition panel 620 and flows into a base portion 652 of the primary chamber 650. The base portion 652 of the primary chamber 650 extends between axially spaced first and second side portions 654 and 656 of the primary chamber which are inflated by the inflation fluid from the base portion of the primary chamber.

The partition panel and the extended retainer panel of the air bag define a secondary chamber 660 of the air bag. The air bag 600 may be considered as including secondary panels for defining the secondary chamber 660. The secondary panels include the center panel 602, the extended retainer panel 640, and the partition panel 620. The secondary chamber 660 is disposed between the first and second inflatable side portions 654 and 656 of the primary chamber 650 and has a tubular configuration encircling the extended retainer panel 640. The secondary chamber 660 is inflated, by ambient air flowing through the aspiration vents 606 and 608, respectively, upon inflation of the primary chamber 650.

The portions of the panels which define the first inflatable side portion 654 of the primary chamber 650 form a first side section 670 (FIG. 15) of the air bag 600. The portions of the panels which define the second inflatable side portion 656 of the primary chamber 650 form a second side section 680 of the air bag 600. An intermediate section 690 of the air bag 600 is disposed between and extends between the side sections 670 and 680 of the air bag.

From the above description of the invention, those skilled in the art will perceive improvements, changes and modifications in the invention. Such improvements, changes and modifications within the skill of the art are intended to be covered by the appended claims.

Having described the invention, we claim:

1. An inflatable vehicle occupant restraint for protecting an occupant of a vehicle, said inflatable restraint having a deflated condition and an inflated, occupant protecting condition, said inflatable restraint when in the inflated condition including inboard and outboard side sections and an intermediate section extending between said side sections, said inflatable restraint having an axis which extends between said inboard and outboard side sections, said inflatable restraint comprising:

primary panel means for defining a primary chamber of said air bag, said primary chamber having a generally U-shaped configuration when inflated, said primary panel means including base panel means for defining a base portion of said primary chamber which extends between said inboard and outboard side sections of said inflatable restraint and which receives inflation fluid from an inflator, said primary panel means also including first side panel means and second side panel means for defining first and second axially spaced inflatable side portions of said primary chamber which are in fluid communication with said base portion of said primary chamber at opposite axial ends of said base portion; and secondary panel means for defining a secondary chamber of said air bag, said secondary panel means including at least one secondary panel having at least one ambient air aspiration opening for aspirating ambient air into said secondary chamber, said secondary chamber being located between said first and second axially spaced inflatable side portions of said primary chamber;

said inboard side section of said inflatable restraint consisting of said first side panel means for defining said first side portion of said primary chamber, and said outboard side section of said inflatable restraint consisting of said second side panel means for defining said second side portion of said primary chamber;

said secondary panel being movable by said first and second side panel means upon inflation of said primary chamber to draw ambient air through said aspiration opening into said secondary chamber to inflate said secondary chamber upon inflation of said primary chamber.

2. An inflatable restraint as set forth in claim 1 including an inflation fluid opening in fluid communication with said primary chamber for directing inflation fluid under pressure from the inflator into said primary chamber to inflate said primary chamber.

3. An inflatable restraint as set forth in claim 2 wherein said inflation fluid opening is located in said base panel means for defining said base portion of said primary chamber.

4. An inflatable restraint as set forth in claim 1 wherein said inflatable restraint has a generally cylindrical configuration, said inflatable side portions of said primary chamber extending transverse to said axis at opposite axial ends of said cylindrical configuration.

5. An inflatable restraint as set forth in claim 1 including at least one vent opening for enabling flow of inflation fluid from said primary chamber into said secondary chamber to help to inflate said secondary chamber upon inflation of said primary chamber.

6. An inflatable restraint as set forth in claim 1 including at least one partition panel extending between said primary chamber and said secondary chamber for at least substantially blocking flow of inflation fluid from said primary chamber into said secondary chamber upon inflation of said primary chamber.

7. An inflatable restraint as set forth in claim 1 wherein said base portion of said primary chamber has an elongate tubular configuration, each one of said first and second inflatable side portions of said primary chamber having a generally disk-shaped configuration.

8. An inflatable restraint as set forth in claim 7 wherein said base portion of said primary chamber is in fluid communication with outer peripheral portions of said first and second inflatable side portions of said primary chamber.

9. An inflatable restraint as set forth in claim 1 wherein said secondary panel comprises a center panel having opposite ends connected with said base panel means for defining said base portion of said primary chamber, said center panel having a first side connected with said first side panel means for defining said first inflatable side portion of said primary chamber and a second side connected with said second side panel means for defining said second inflatable side portion of said primary chamber.

10. An inflatable restraint as set forth in claim 9 wherein said secondary panel has a generally rectangular configuration, said first side panel means comprising a first pair of generally circular panel portions which define between them said first inflatable side portion of said primary chamber, said second side panel means comprising a second pair of generally circular panel portions which define between them said second inflatable side portion of said primary chamber.

11. An inflatable restraint as set forth in claim 1 wherein said secondary chamber includes a first secondary chamber portion and a second secondary chamber portion, said second secondary chamber portion being spaced apart from said first secondary chamber portion and a portion of said primary chamber extending between said first and second secondary chamber portions, said secondary panel means including at least a first aspiration opening for aspirating ambient air into said first secondary chamber portion, said secondary panel means including at least a second aspiration opening for aspirating ambient air into said second secondary chamber portion.

12. An inflatable restraint as set forth in claim 11 wherein said secondary panel means includes a center panel and first and second partition panels each connected with said center panel, said inflatable restraint further comprising at least one tether panel extending between and interconnecting said first and second partition panels, said at least one tether panel extending through said base portion of said primary chamber.

13. An inflatable restraint as set forth in claim 1 including an inflation fluid opening in said base panel means for receiving inflation fluid from the inflator to inflate said primary chamber, said secondary panel means comprising a partition panel connected with said center panel, said partition panel having an inflation fluid opening which is spaced apart from the inflation fluid opening in said center panel, said inflatable restraint further comprising an extended retainer panel extending between and interconnecting said center panel and said partition panel, said extended retainer panel defining an inflation fluid passage extending between the inflation fluid opening in said center panel and the inflation fluid opening in said partition panel.

14. An inflatable restraint as set forth in claim 13 wherein said partition panel and said extended retainer panel define between them said secondary chamber of said inflatable restraint, said secondary chamber having a tubular configuration.

* * * * *